United States Patent
Lu

(10) Patent No.: US 12,425,712 B1
(45) Date of Patent: Sep. 23, 2025

(54) ROTATABLE AND LIFTABLE CAMERA DEVICE

(71) Applicant: Sen Lu, Hechi (CN)

(72) Inventor: Sen Lu, Hechi (CN)

( * ) Notice: Subject to any disclaimer, the term of this patent is extended or adjusted under 35 U.S.C. 154(b) by 0 days.

(21) Appl. No.: 19/081,126

(22) Filed: Mar. 17, 2025

(30) Foreign Application Priority Data

Jan. 27, 2025 (CN) .......................... 202520177672.3

(51) Int. Cl.
  *H04N 23/57* (2023.01)
  *H04N 23/51* (2023.01)

(52) U.S. Cl.
  CPC ............ *H04N 23/57* (2023.01); *H04N 23/51* (2023.01)

(58) Field of Classification Search
  CPC .............................. H04N 23/57; H04N 23/51
  See application file for complete search history.

(56) References Cited

U.S. PATENT DOCUMENTS

| | | | |
|---|---|---|---|
| 2017/0363262 A1* | 12/2017 | Chien | F21V 21/0925 |
| 2020/0084307 A1* | 3/2020 | Gong | H04N 23/57 |
| 2020/0113645 A1* | 4/2020 | Genova | A61B 90/30 |
| 2024/0205529 A1* | 6/2024 | Wang | H04R 1/028 |

FOREIGN PATENT DOCUMENTS

| | | | | |
|---|---|---|---|---|
| DE | 102012105996 A1 * | 5/2014 | | E03B 7/095 |
| WO | WO-2015104109 A1 * | 7/2015 | | H05K 7/1469 |

* cited by examiner

*Primary Examiner* — Amy R Hsu
(74) *Attorney, Agent, or Firm* — HOWARD M COHN and Associates, LLC

(57) ABSTRACT

A rotatable and liftable camera device includes a housing and a camera assembly. The camera assembly is moveably mounted in the housing and is configured to move upwards or downwards between a raised position and a lowered position. The housing includes an upper housing and a lower housing configured to rotate relative to the upper housing; and the camera assembly is configured to move upwards or downwards along with rotation of the upper housing relative to the lower housing. The camera assembly can move upwards and downwards according to different scenarios, especially for covert recording suitable for special scenarios, which is flexible and convenient for use. Rotation of the upper housing relative to the lower housing can drive the camera module to move upwards or downwards, which is convenient for a user to operate with a single hand.

20 Claims, 17 Drawing Sheets

ROTATABLE AND LIFTABLE CAMERA DEVICE

CROSS-REFERENCE TO RELATED APPLICATIONS

This application claims priority benefits to Chinese Patent Application No. 202520177672.3 filed on Jan. 27, 2025. The contents of the application are incorporated herein by reference.

FIELD

The subject matter herein generally relates to a rotatable and liftable camera device.

BACKGROUND

In modern fast-paced work and life, there are many situations where video recording is required for scene documentation. Especially in certain special scenarios, covert recording is necessary to avoid suspicion from the subjects being recorded. Examples include undercover investigations by journalists, covert evidence collection by police, recording for legal case documentation by lawyers, and recording by ordinary citizens encountering criminal acts. Currently, covert camera devices on the market are typically small in size, with fixed camera modules integrated into the housing, leading to limitations in practical applications.

SUMMARY

The objective of the present disclosure is to provide a rotatable and liftable camera device. The rotatable and liftable camera device includes a housing and a camera assembly. The camera assembly is moveably mounted in the housing and is configured to move upwards or downwards between a raised position and a lowered position. The housing includes an upper housing and a lower housing configured to rotate relative to the upper housing; and the camera assembly is configured to move upwards or downwards along with rotation of the upper housing relative to the lower housing.

In one or more embodiments of the present disclosure, a lifting mechanism configured to move the camera assembly upwards or downwards is arranged in the housing, and the upper housing is connected to the lifting mechanism to drive the lifting mechanism when the upper housing rotates.

In one or more embodiments of the present disclosure, the lifting mechanism includes a rotating cylinder and a guide cylinder; the guide cylinder is sleeved on the camera assembly and fixedly arranged on the lower housing; the rotating cylinder is rotatably sleeved on the guide cylinder and fixed in the upper housing; an axis of the guide cylinder coincides with a rotational axis of the rotating cylinder; and the guide cylinder is provided with at least one rotational guide slot inclined upward from bottom to top around the rotational axis of the rotating cylinder; the rotating cylinder is provided with at least one linear guide slot extending straight along the rotational axis of the rotating cylinder; the camera assembly includes at least one radial pin extending along a radial direction of the guide cylinder, and each radial pin is configured to extend through a corresponding one of the at least one rotational guide slot of the guide cylinder and to be inserted into a corresponding one of the at least one linear guide slot of the rotating cylinder.

In one or more embodiments of the present disclosure, an upper end of each rotational guide slot is provided with an upper limit slot extending horizontally around the rotational axis of the rotating cylinder; a lower end of each rotational guide slot is provided with a lower limit slot extending horizontally around the rotational axis; and the camera assembly is in a raised position when the radial pin moves into the upper limit slot, and in a lowered position when the radial pin moves into the lower limit slot.

In one or more embodiments of the present disclosure, the number of the radial pin is two, and two radial pins are symmetrically arranged; and the number of the rotational guide slot and the number of the linear guide slot are two.

In one or more embodiments of the present disclosure, an outer wall of the guide cylinder is provided with an annular rib, an inner wall of the rotating cylinder is provided with an annular groove, the annular rib is configured to be received in the annular groove and is rotatable relative to the annular groove.

In one or more embodiments of the present disclosure, the camera assembly includes a camera module; the camera module is configured to extend outside the housing when the camera assembly is in the raised position and to retract into the housing when the camera assembly is in the lowered position; a top side of the upper housing is provided with a through hole configured to allow the camera module to protrude outside the housing; and the camera module is configured to be exposed through the through hole when the camera assembly is in the lowered position.

In one or more embodiments of the present disclosure, the camera assembly further includes a bracket and a protective cover; the radial pins are arranged on a peripheral side of the bracket; the camera module is mounted on a top side of the bracket; the protective cover includes a cover portion and a connection portion arranged at a lower edge of the cover portion; the cover portion is configured to enclose the camera module and to move along the through hold during vertical movement of the camera assembly; and the connection portion is connected to the bracket; the connection portion abuts against an inner side of the upper housing when the camera assembly is in the raised position.

In one or more embodiments of the present disclosure, a supporting portion is provided in the guide cylinder and configured to abut against the supporting portion when the camera assembly is in the lowered position.

In one or more embodiments of the present disclosure, the bracket includes a cylindrical section and a support section arranged on the cylindrical section; the radial pins are arranged on the cylindrical section of the bracket; and the camera module is arranged on the support section, an inner side of the cover portion of the protective cover is provided with a limiting portion, and the limiting portion abuts against the camera module to clamp camera module between the protective cover and the bracket.

In one or more embodiments of the present disclosure, the connection portion of the protective cover is provided with insertion posts, the cylindrical section of the bracket is provided with insertion holes configured to be engaged with the insertion holes.

In one or more embodiments of the present disclosure, the rotatable and liftable camera device further includes a flexible circuit board, a first end of the flexible circuit board is connected to the camera assembly and is configured to move along vertical movement of the camera assembly; and a second end of the flexible circuit board is fixed relative to the lower housing.

In one or more embodiments of the present disclosure, the rotatable and liftable camera device further includes a control circuit board fixed inside the lower housing; wherein the bracket is in communication with the lower housing, the flexible circuit board is routed through the bracket; the first end of the flexible circuit board is connected to the camera module, and the second end of the flexible circuit board is connected to the control circuit board.

In one or more embodiments of the present disclosure, the rotatable and liftable camera device further includes a rechargeable battery; wherein the rechargeable battery is fixed in the lower housing and is electrically connected to the control circuit board; the control circuit board is provided with a charging port with an insertion end exposed on the lower housing.

In one or more embodiments of the present disclosure, the control circuit board is provided with a data port configured to receive a memory card, and the lower housing is provided with a slot configured to allow the memory card to be inserted through.

In one or more embodiments of the present disclosure, multiple control buttons are provided on the control circuit board and configured to be exposed on the lower housing.

In one or more embodiments of the present disclosure, a fixing plate is provided in the lower housing, and the control circuit board is mounted on the fixing plate; the fixing plate is provided with a first connection post and a second connection post; and the control circuit board is connected to the first connection post and the second connection post through screws; the first connection post includes a positioning portion, both the positioning portion and the second connection post are provided with threaded holes; the control circuit board is provided with a positioning hole and a connection hole; the positioning portion is inserted into the positioning hole to allow one of the screws to be screwed through; and the threaded hole on the second connection post is aligned with the connection hole to allow another one of the screws to be screwed through.

In one or more embodiments of the present disclosure, the fixing plate extends vertically, the control circuit board is mounted on one side of the fixing plate; the rechargeable battery is positioned on the other side of the fixing plate; and an upper end of the control circuit board is connected to the flexible circuit board; the charging port, the data port and the control buttons are arranged at a lower end of the control circuit board.

In one or more embodiments of the present disclosure, the rotating cylinder is detachably connected to the upper housing through a first snap-fit structure; and the first snap-fit structure includes a first snap hook on the upper housing and a first retaining portion on the rotating cylinder, and the first snap hook is configured to be engaged with the first retaining portion.

In one or more embodiments of the present disclosure, the guide cylinder is detachably connected to the lower housing through a second snap-fit structure; and the second snap-fit structure includes a second snap hook on the lower housing and a second retaining portion on the guide cylinder, and the second snap hook is configured to be engaged with the second retaining portion.

In the rotatable and liftable camera device of the present disclosure, the camera assembly can move upwards and downwards, which is flexible and convenient for operation. The camera module is selectively to move upwards or downwards according to different scenarios, especially for covert recording suitable for special scenarios. In use, rotation of the upper housing relative to the lower housing can drive the camera module to move upwards or downwards, which is convenient for a user to operate with a single hand. It is easy and quick for operation. For example, the camera device can be placed in a backpack with the camera assembly moving to the raised position to record. It is simple in structure and convenient for use.

Figure 1:
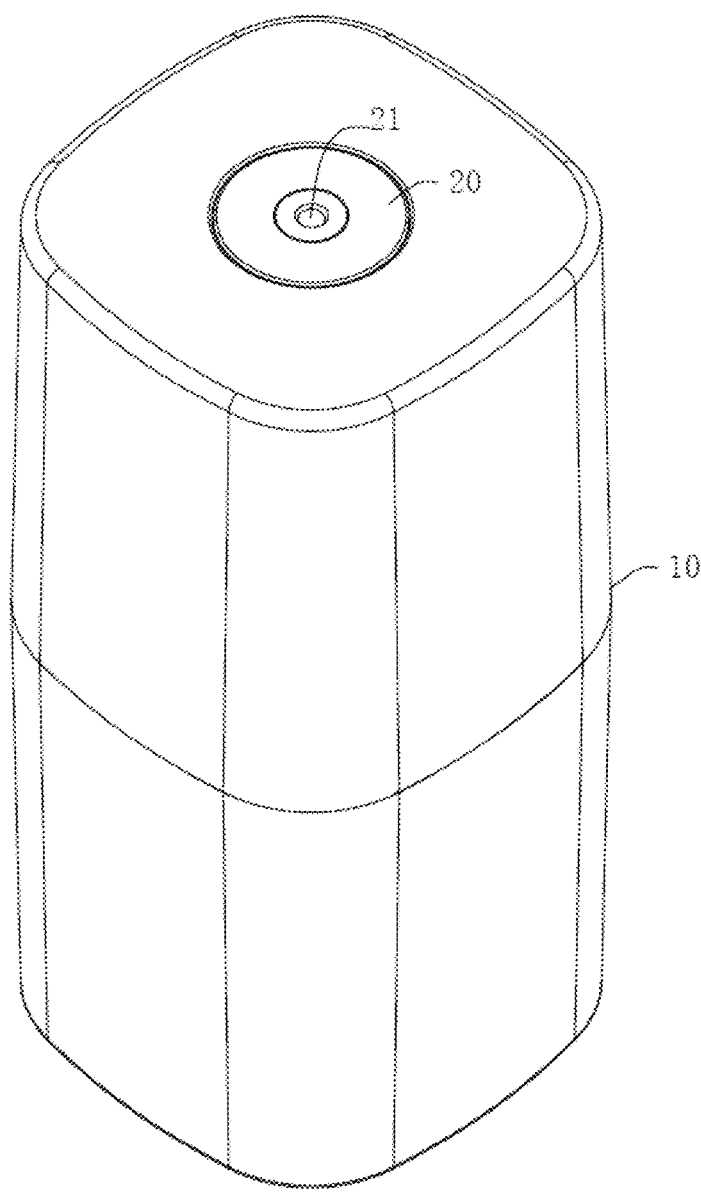
FIGS. 1 and 2 are schematic structural diagrams of a rotatable and liftable camera device from different angles according to an embodiment of the present disclosure.
Figure 2:
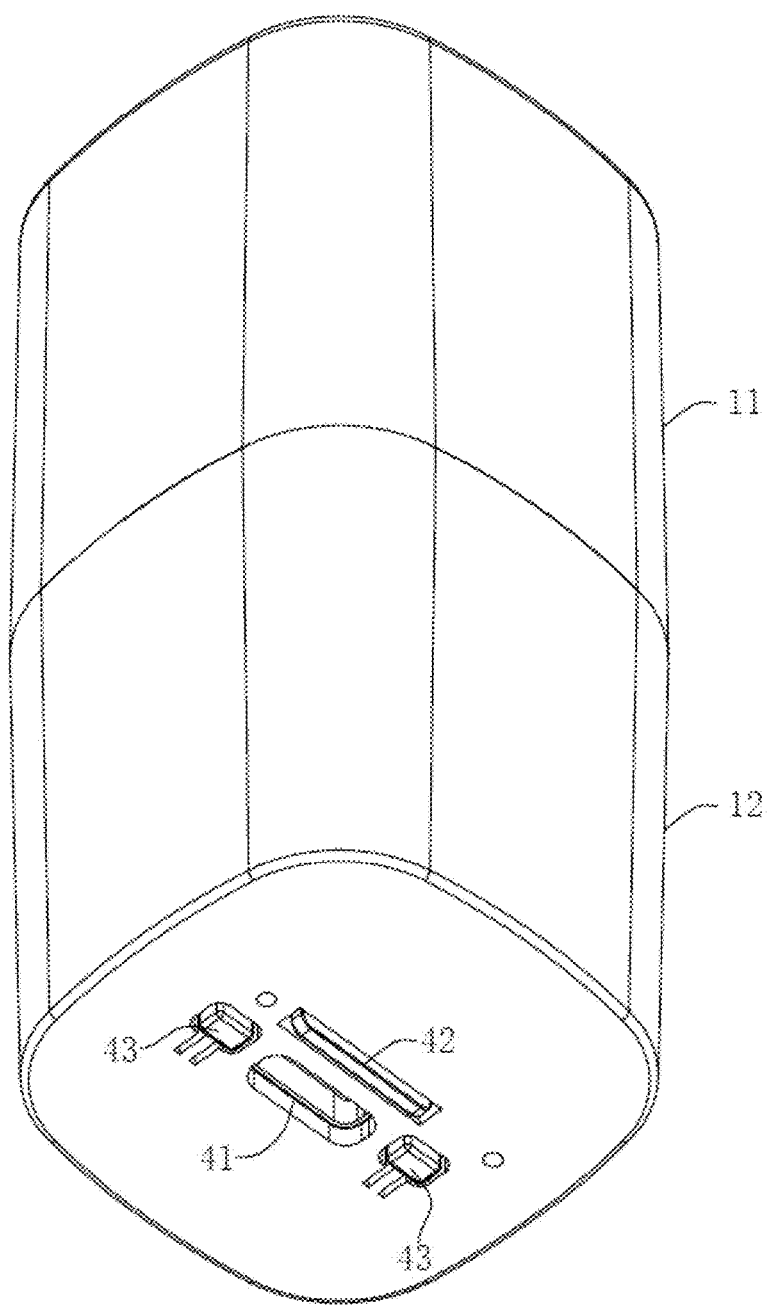

In the drawing: housing 10, upper housing 11, through hole 111, bottom shell 2, accommodating chamber 111, first snap hook 112, lower housing 12, second snap hook 121, rotating cylinder 13, linear guide slot 131, annular groove 132, first mounting lug 133, first mounting hole 134, guide cylinder 14, rotational guide slot 141, upper limit slot 1411, lower limit slot 1412, annular rib 142, supporting portion 143, second mounting lug 144, second mounting hole 145, fixing plate 15, first connection post 151, positioning portion 1511, second connection post 152, support post 153, camera assembly 20, camera module 21, bracket 22, radial pin 221, cylindrical section 222, support section 223, insertion hole 224, flexible circuit board 30, control circuit board 40, charging port 41, memory card 42, control button 43, positioning hole 44, connection hole 45, rotational axis L, rechargeable battery 50.

DETAILED DESCRIPTION

The present disclosure is detailed described in conjunction with attached drawings.

Please referring to FIGS. 1-17, a rotatable and liftable camera device provided by an embodiment of the present disclosure includes a housing 10, a camera assembly 20, a flexible circuit board 30, a control circuit board 40 and a rechargeable battery 50.

The housing 10 includes an upper housing 11 and a lower housing 12 configured to be rotatable relative to the upper housing 11. The camera assembly 20 is configured to move upward or downward along with rotation of the upper housing 11 relative to the lower housing 12.

Additionally, the housing 10 is internally provided with a lifting mechanism configured to move the camera assembly 20 upwards or downwards. The upper housing 11 is connected to the lifting mechanism to drive the lifting mechanism when the upper housing 11 rotates.

Specifically, the lifting mechanism includes a rotating cylinder 13 and a guide cylinder 14. The guide cylinder 14 is sleeved on the camera assembly 20 and fixedly mounted on the lower housing 12. The rotating cylinder 13 is rotatably sleeved on the guide cylinder 14 and fixed within the upper housing 11. The axis of the guide cylinder 14 coincides with the rotational axis L of the rotating cylinder 13. The guide cylinder 14 is provided with a rotational guide slot 141, which is inclined upward from bottom to top around the rotational axis L of the rotating cylinder 13. The rotating cylinder 13 is provided with a linear guide slot 131 extending straight along the direction of the rotational axis L of the rotating cylinder 13. The camera assembly 20 includes a radial pin 221 extending along a radial direction of the guide cylinder 14. The radial pin 221 extends through the rotational guide slot 141 of the guide cylinder 14 and is inserted into the linear guide slot 131 of the rotating cylinder 13.

The radial pin 221 (i.e., the camera assembly 20) is constrained and guided by the linear guide slot 131 to slide upwards and downwards along a straight line. When the rotating cylinder 13 rotates relative to the guide cylinder 14, the radial pin 221 is driven to rotate and simultaneously slide upwards and downwards along the linear guide slot 131. The rotating cylinder 13 is fixedly installed inside the upper housing 11, which allows the rotating cylinder 13 to rotate synchronously along with rotation of the upper housing 11.

Figure 5:
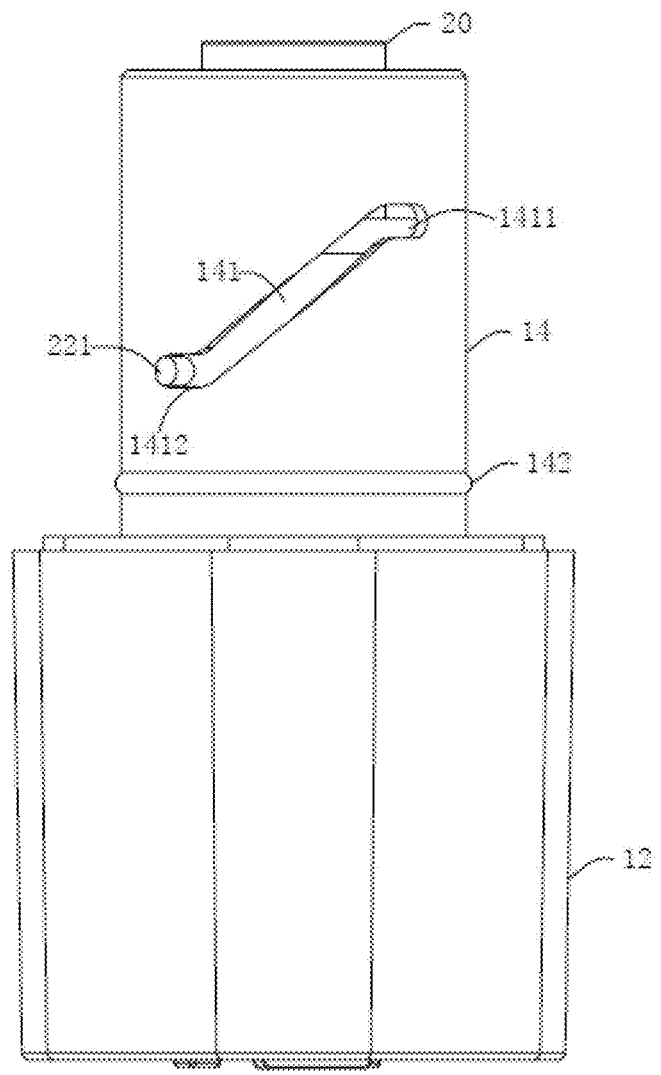
FIG. 5 is a schematic diagram showing an engagement structure between the camera assembly of the present disclosure and a rotational guide slot when the camera assembly is in a lowered position.
Figure 6:
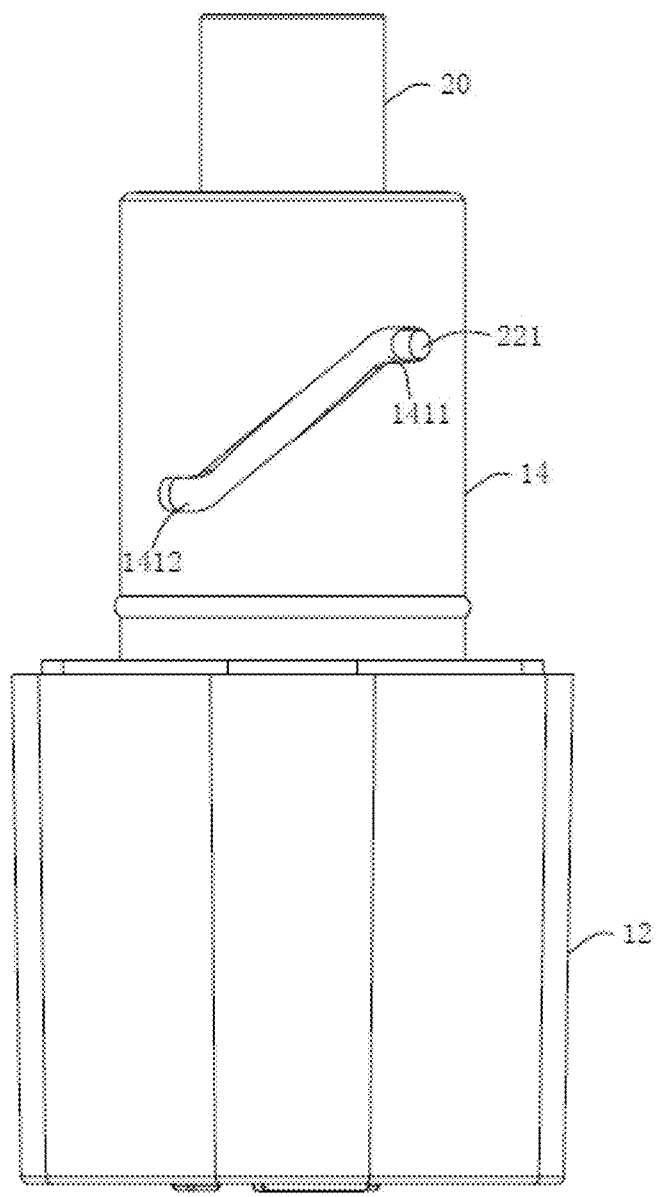
FIG. 6 is a schematic diagram showing the engagement structure between the camera assembly of the present disclosure and the rotational guide slot when the camera assembly is in a raised position.
Figure 7:
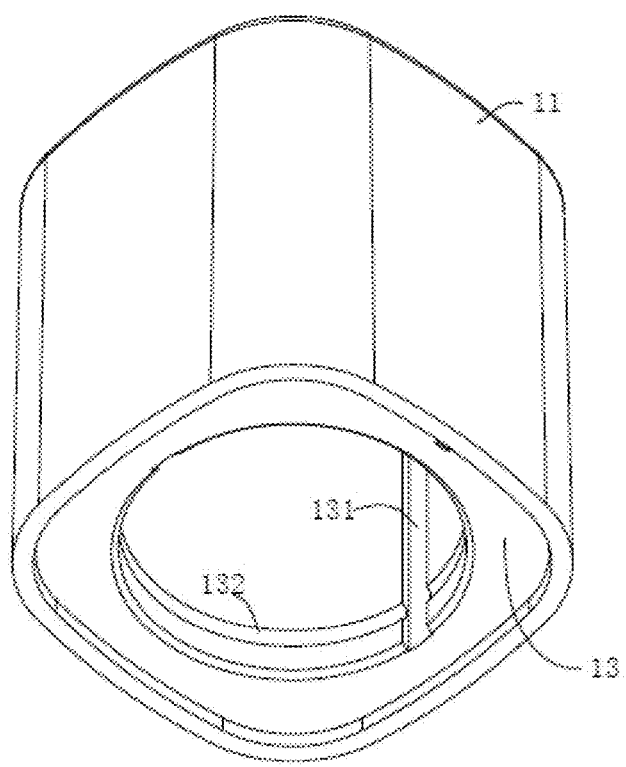
FIG. 7 is a schematic diagram showing an engagement structure between an upper housing and a rotating cylinder of the present disclosure.
Figure 8:
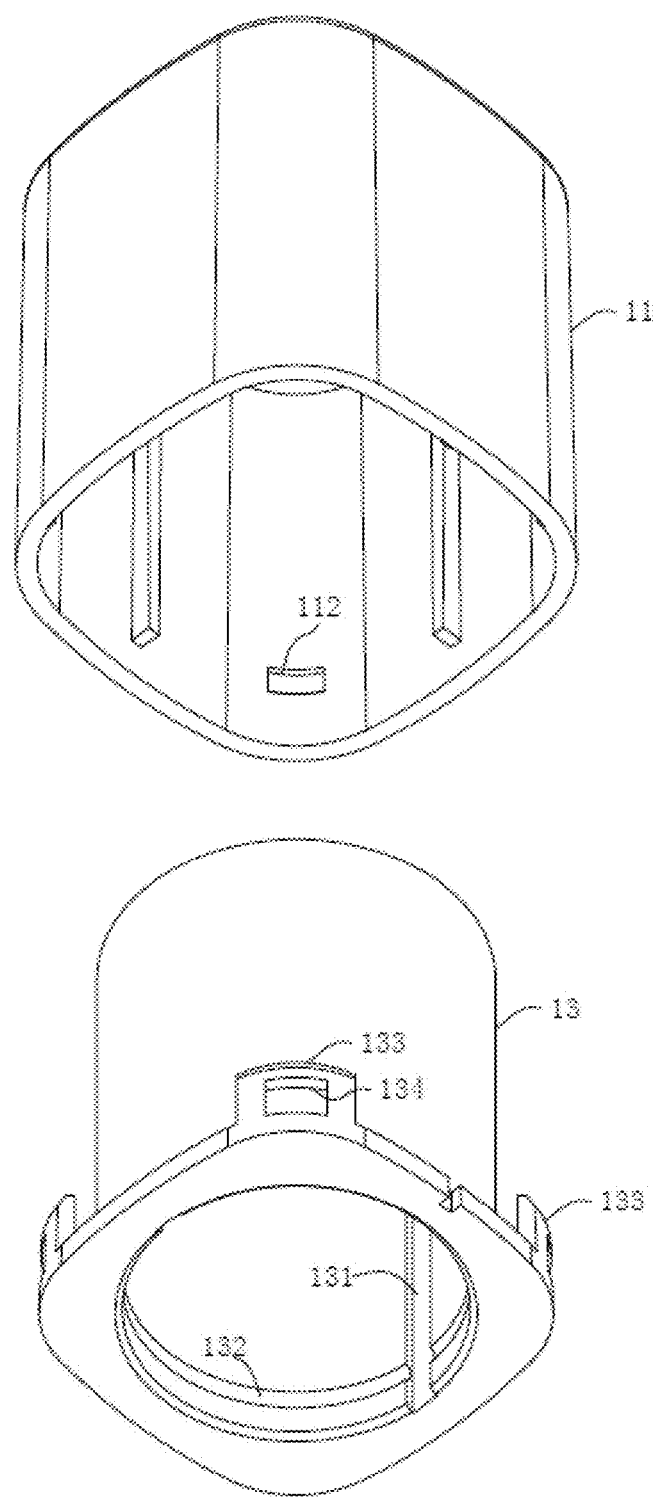
FIG. 8 is an exploded view of the engagement structure between the upper housing and the rotating cylinder of the present disclosure.
Figure 9:
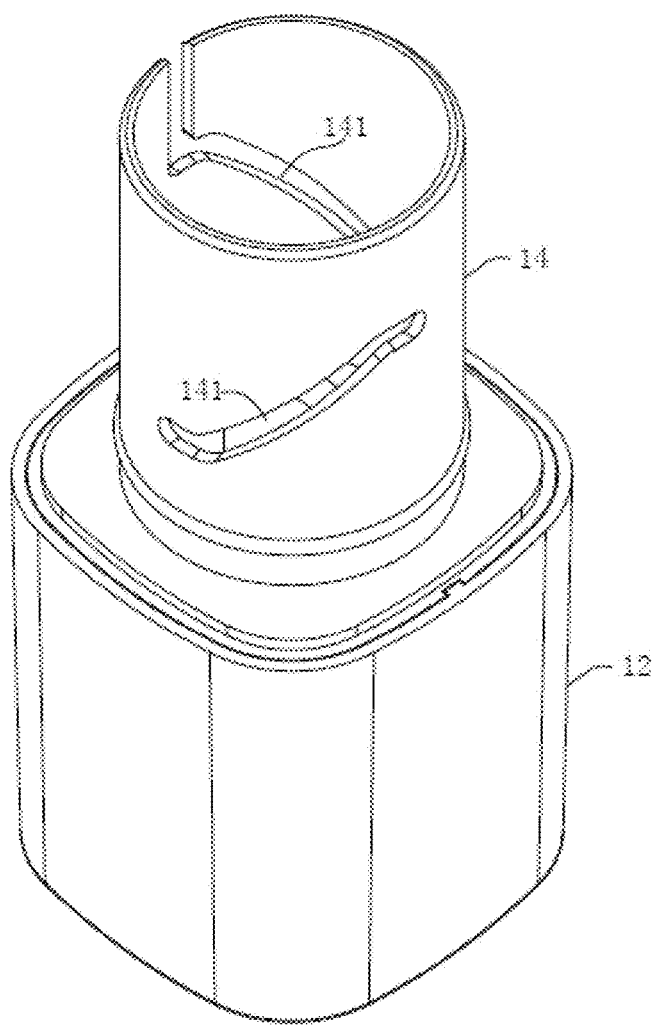
FIG. 9 is a schematic diagram showing an engagement structure between the lower housing and a guide cylinder of the present disclosure.
Figure 10:
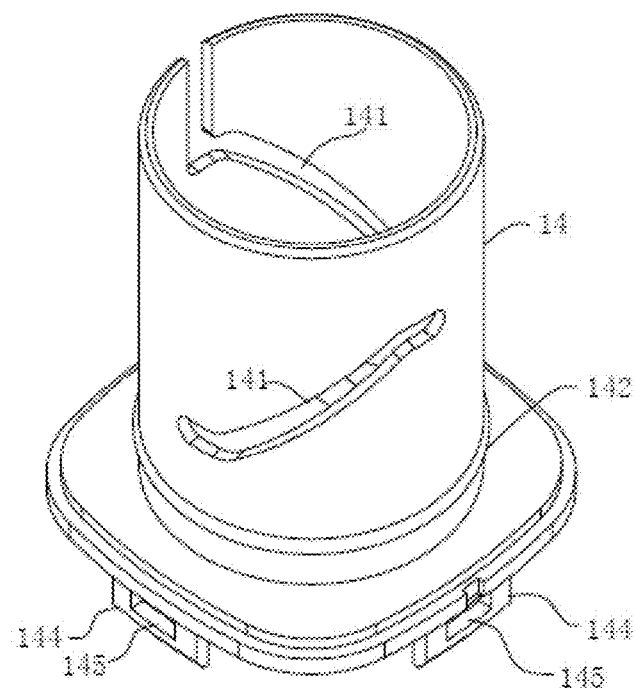
FIG. 10 is an exploded view of the engagement structure between the lower housing and the guide cylinder of the present disclosure.
Figure 10:
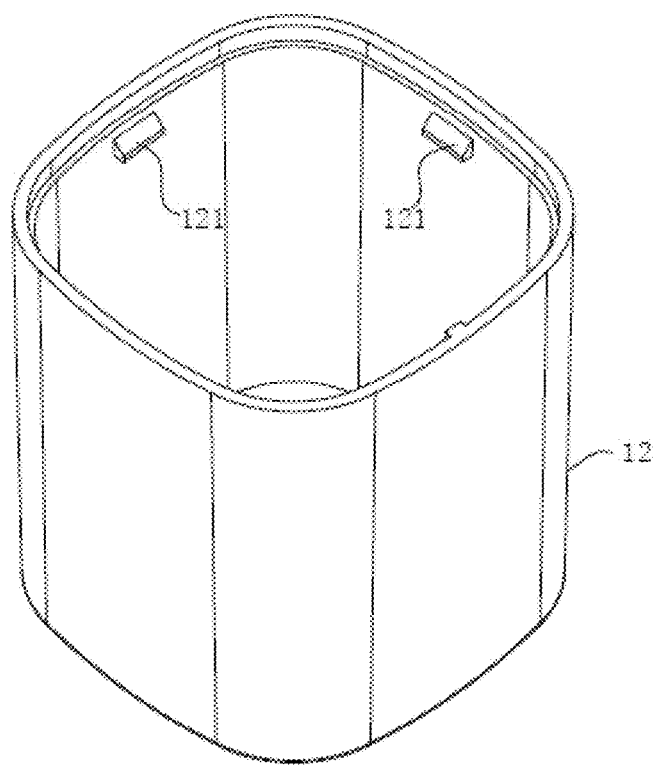
Figure 11:
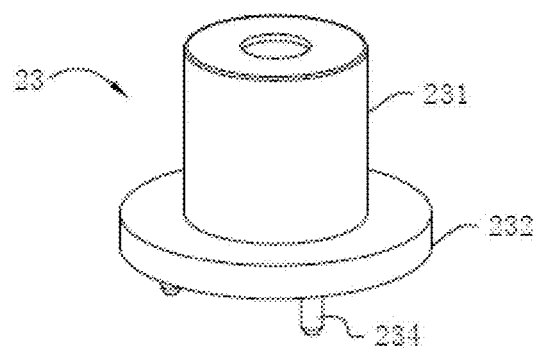
FIG. 11 is an exploded view of the camera assembly of the present disclosure.
Figure 11:
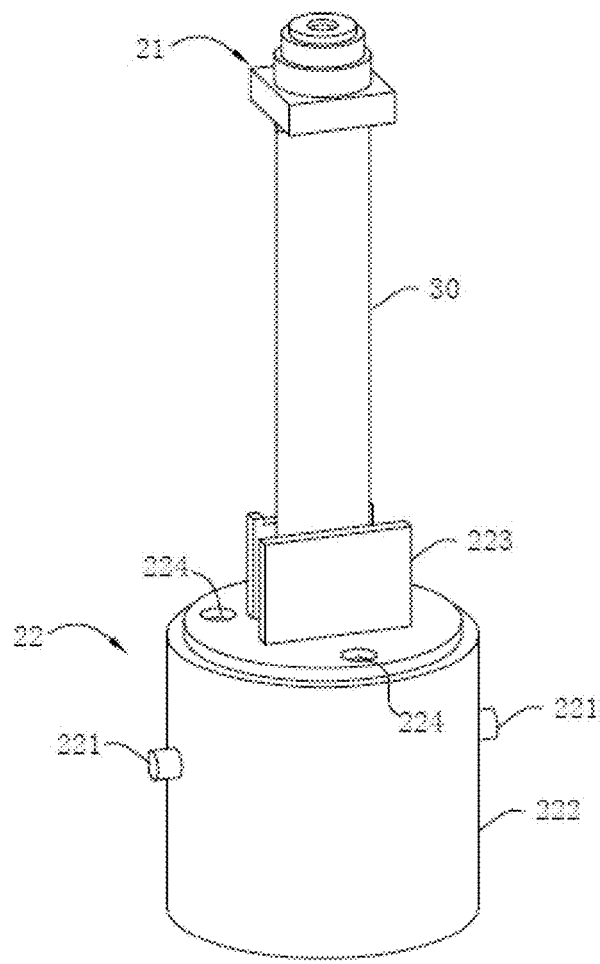
Figure 12:
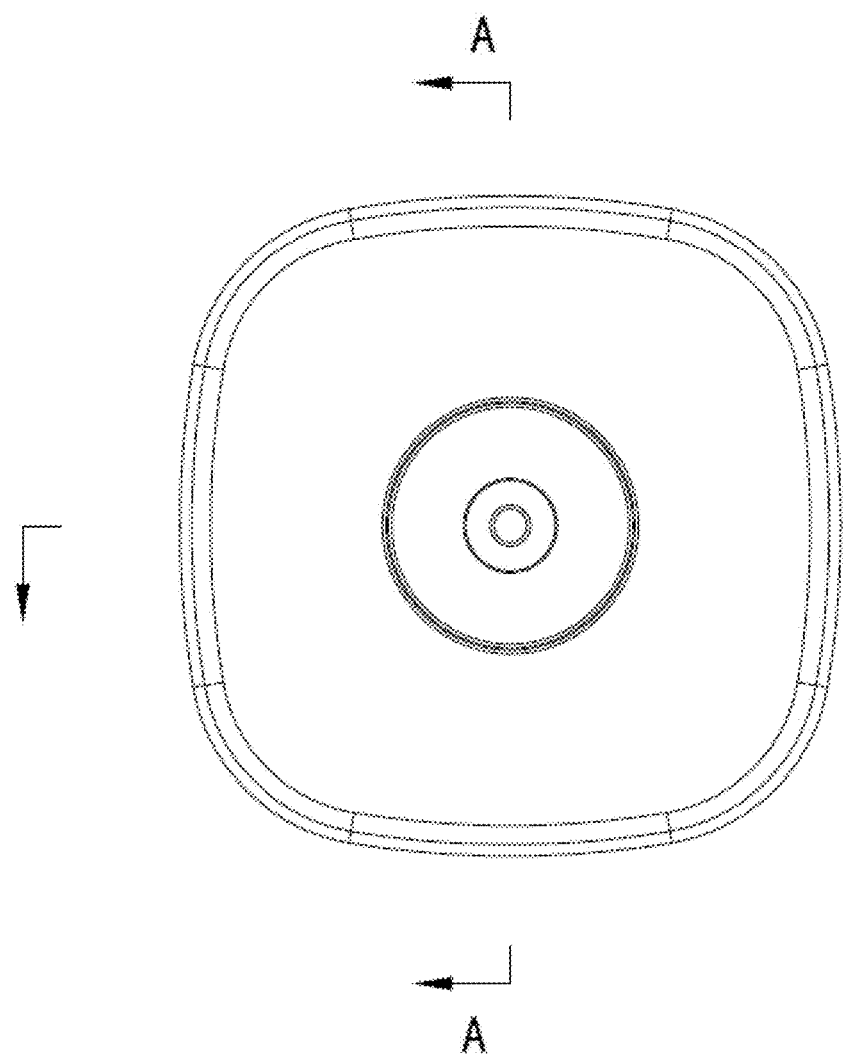
FIG. 12 is a top view of the present disclosure.
Figure 13:
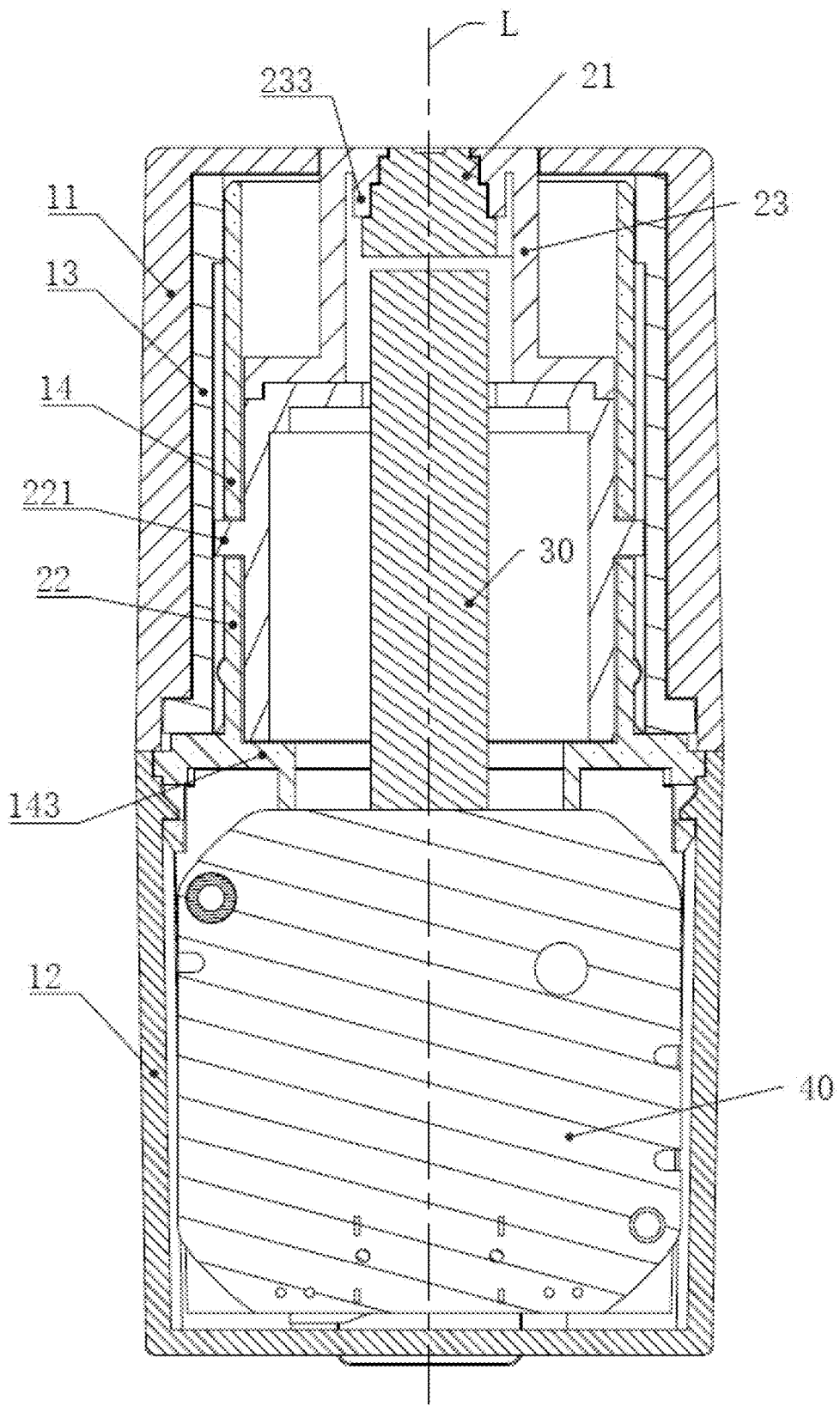
FIG. 13 is a cross-sectional view taken along line A-A in FIG. 12.
Figure 14:
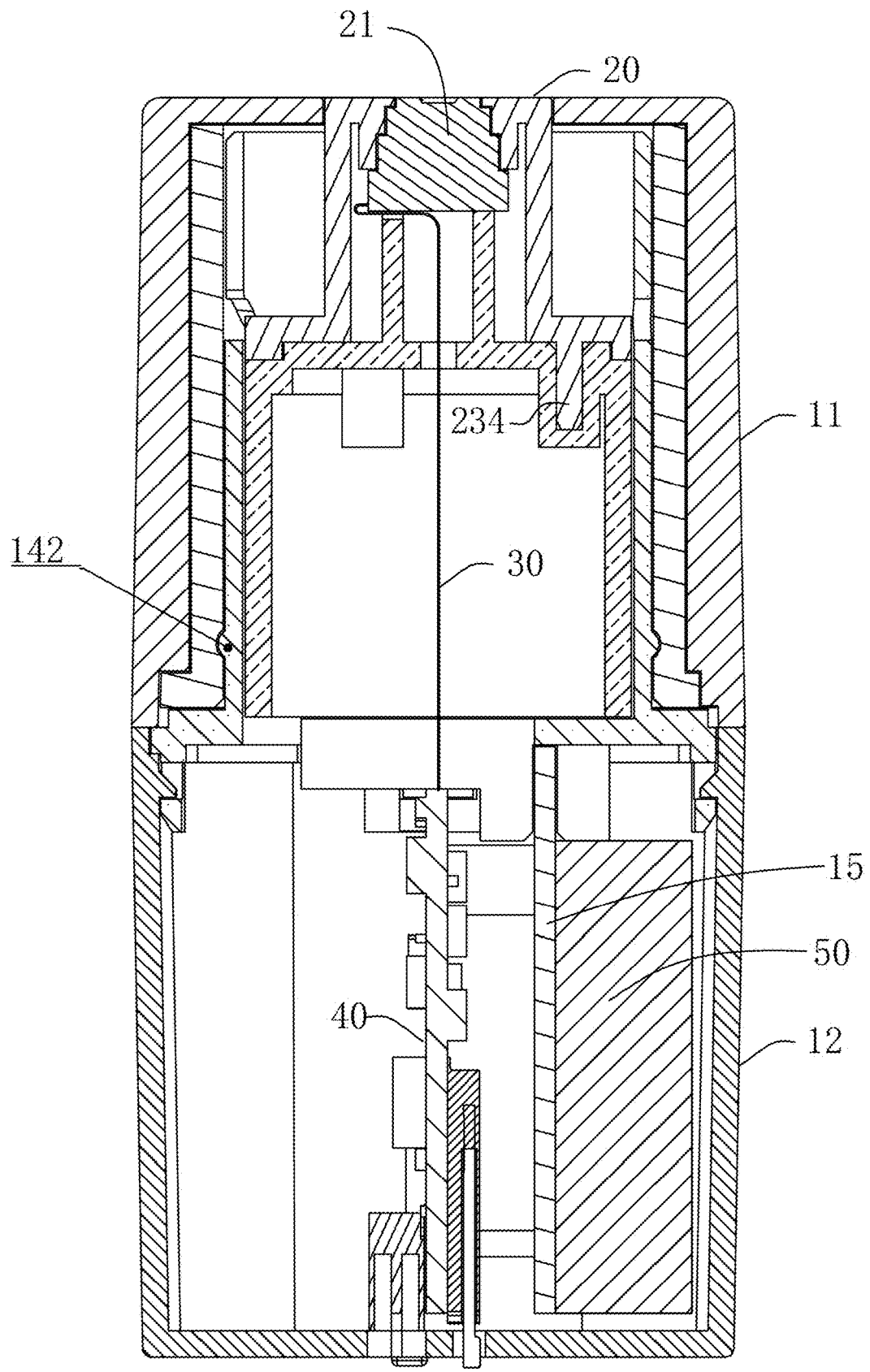
FIG. 14 is a cross-sectional view taken along line B-B in FIG. 12.
Figure 15:
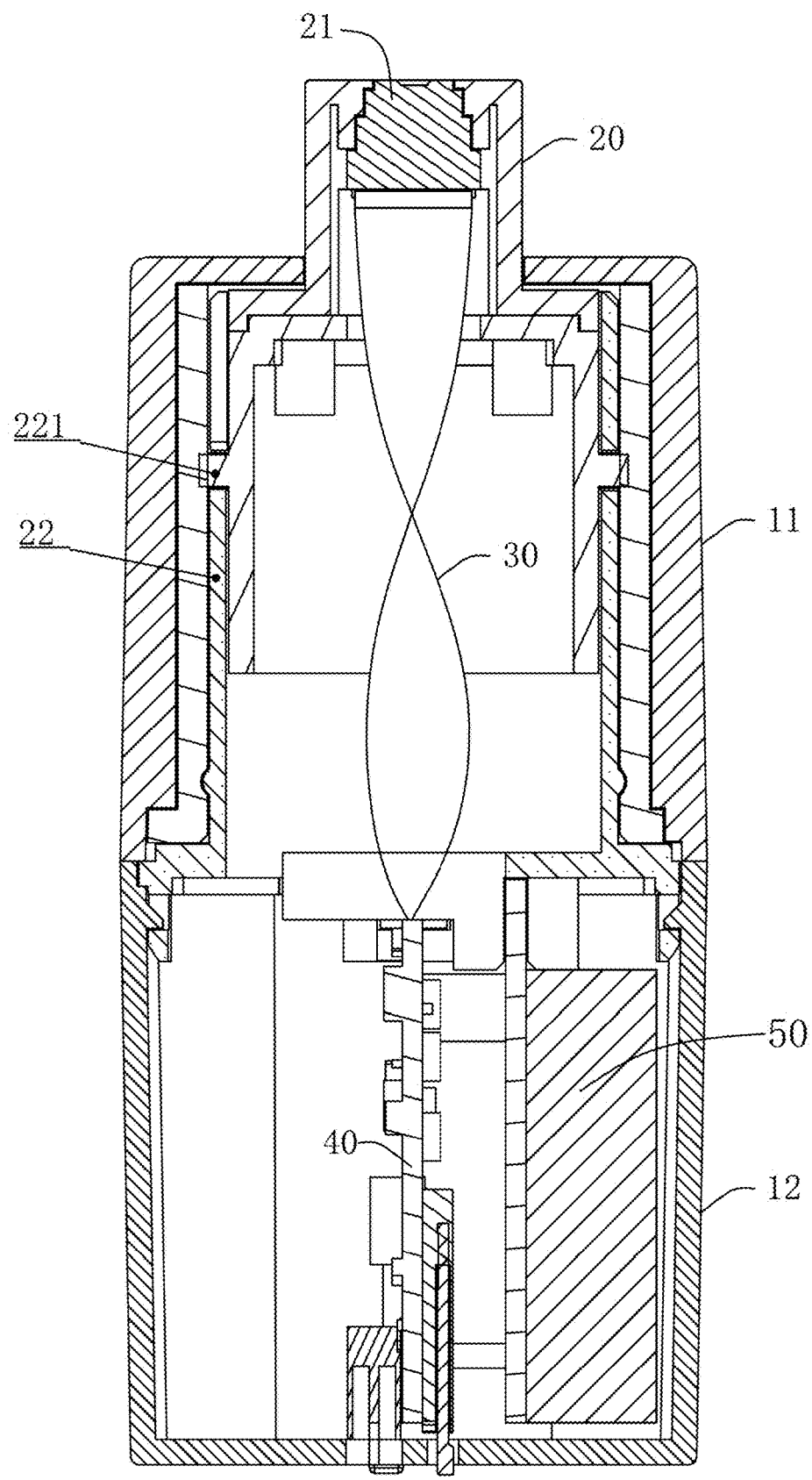
FIG. 15 is a cross-sectional view of the camera assembly of the present disclosure in a raised position.

As shown in FIGS. 5 and 6, an upper end of the rotational guide slot 141 is provided with an upper limit slot 1411 extending horizontally around the rotational axis L of the rotating cylinder 13, while a lower end is provided with a lower limit slot 1412 extending horizontally around the rotational axis L. The camera assembly 20 is in a raised position when the radial pin 221 moves into the upper limit slot 1411, and in a lowered position when the radial pin 221 moves into the lower limit slot 1412.

The technical solution of the present disclosure restricts the vertical movement range of the camera assembly 20 through the upper limit slot 1411 and the lower limit slot 1412. Meanwhile, horizontal extension of these slots provides a buffering effect.

The number of the radial pins 221 is two and two radial pins are symmetrically arranged. Correspondingly, the number of the rotational guide slots 141 and the number of the linear guide slots 131 are also two to ensure balanced guidance and stable vertical movement.

An outer wall of the guide cylinder 14 is provided with an annular rib 142, while the inner wall of the rotating cylinder 13 is provided with an annular groove 132. The annular rib 142 is received in the annular groove 132 and is rotatable relative to the annular groove 132.

In the present disclosure, interaction between the annular rib 142 and the annular groove 132 limits axial movement and stabilizes rotation of the camera assembly 20.

Figure 3:
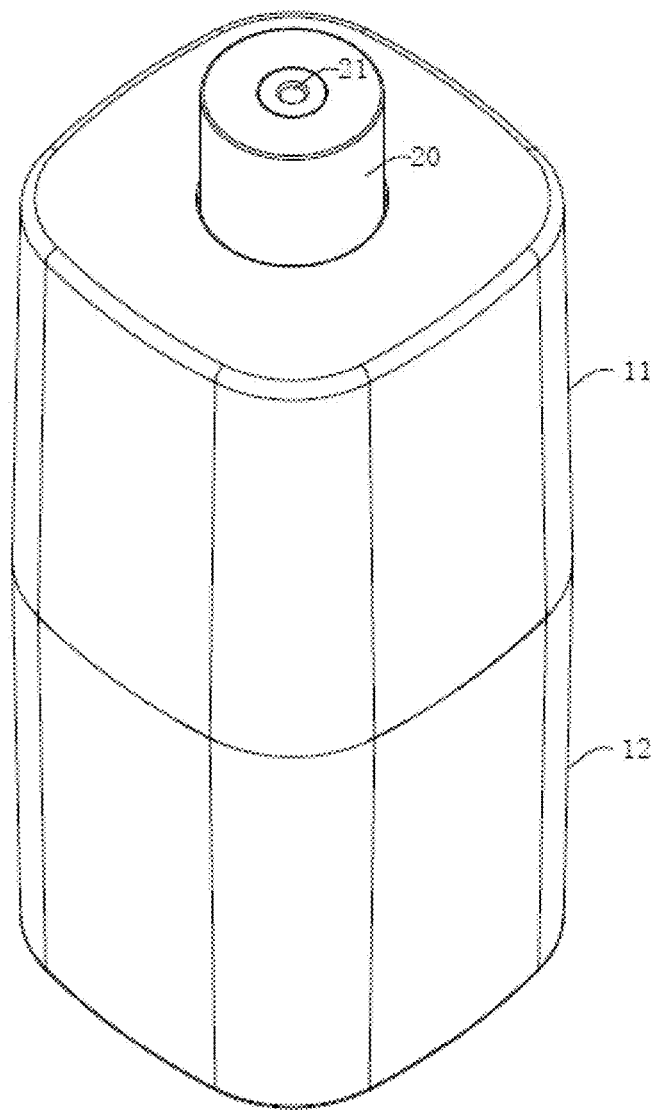
FIG. 3 is a schematic structural diagram of the rotatable and liftable camera device in a raised position.
Figure 4:
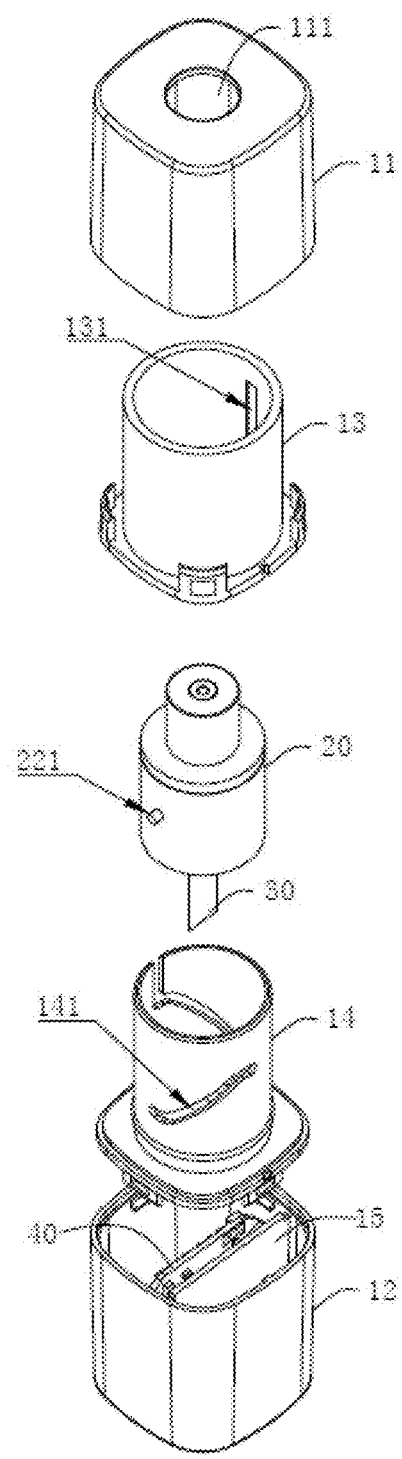
FIG. 4 is an exploded view of the rotatable and liftable camera device of the present disclosure.

The camera assembly 20 is vertically movably mounted on the housing 10 to switch between a raised position and a lowered position. The camera assembly 20 includes a camera module 21. When the camera assembly 20 is in the raised position, the camera module 21 extends outside the housing 10, as shown in FIG. 3. when the camera assembly 20 is in the lowered position, the camera module 21 retracts into the housing 10, as shown in FIG. 1.

A top side of the upper housing 11 is provided with a through hole 111 allowing the camera module 21 to protrude outside the housing 10. Notably, even in the lowered position, a lens of the camera module 21 remains exposed through the through hole 111, enabling covert filming while the camera module 21 is concealed within the housing 10.

As shown in FIGS. 11-15, the camera assembly 20 further includes a bracket 22 and a protective cover 23. The radial pins 221 are arranged on a peripheral side of the bracket 22. The camera module 21 is mounted on a top side of the bracket 22. The protective cover 23 includes a cover portion 231 and a connection portion 232 located at a lower edge of the cover portion 231. The cover portion 231 encloses the camera module 21 and moves along the through hole 111 during vertical movement of the camera assembly 20. The connection portion 232 is secured to the bracket 22. When the camera assembly 20 reaches the raised position, the connection portion 232 abuts against an inner side of the upper housing 11, further limiting upward movement of the camera assembly 20.

The guide cylinder 14 is internally provided with a supporting portion 143. When the camera assembly 20 is in the lowered position, the bracket 22 abuts against the supporting portion 143, further limiting downward movement of the camera assembly 20.

The bracket 22 includes a cylindrical section 222 and a support section 223 arranged on the cylindrical section 222. The radial pins 221 are arranged on the cylindrical section 222 of the bracket 22. The camera module 21 is arranged on the support section 223. An inner side of the cover portion 231 of the protective cover 23 is provided with a limiting portion 233, which abuts against the camera module 21 to clamp camera module 21 between the protective cover 23 and the bracket 22. In the embodiment, an upper part of the camera module 21 is configured as a stepped ring, and the limiting portion 233 is shaped as a stepped annular groove. The camera module 21 is secured through the cooperative engagement between the protective cover 23 and the bracket 22, eliminating the need for additional fasteners and facilitating installation and disassembling.

The connection portion 232 of the protective cover 23 is provided with insertion posts 234, while the cylindrical section 222 of the bracket 22 is provided with insertion holes 224. The insertion posts 234 are engaged with the insertion holes 224, forming a simple and easily implementable connection structure.

A first end of the flexible circuit board 30 is connected to the camera assembly 20 and moves synchronously with the camera assembly during vertical movement of the camera assembly 20, and a second end of the flexible circuit board 30 remains fixed relative to the lower housing 12.

Additionally, the control circuit board 40 is fixed inside the lower housing 12. The bracket 22 is in communication with the lower housing 12, and the flexible circuit board 30 is routed through the bracket 22. The first end of the flexible circuit board 30 is connected to the camera module 21, and the second end is connected to the control circuit board 40, ensuring that the second end remains stationary relative to the lower housing 12.

In the present disclosure, the camera module 21 is electrically connected to the control circuit board 40 via the flexible circuit board 30. As the camera assembly 20 moves vertically, the flexible circuit board 30 synchronously extends or retracts, maintaining stable electrical connectivity. Specifically, when the camera assembly 20 is in the lowered position, the flexible circuit board 30 is bent (the bent state is not shown in figures); when the camera assembly 20 is in the raised position, the flexible circuit board 30 is helically extended.

A rechargeable battery 50 is fixed within the lower housing 12 and electrically connected to the control circuit board 40. The control circuit board 40 is equipped with a charging port 41, whose insertion end is exposed on the lower housing 12. The rechargeable battery 50 provides power to the camera device.

The control circuit board 40 further includes a data port configured to receive a memory card 42 to store captured data. The lower housing 12 is provided with a slot for inserting the memory card 42.

Additionally, the control circuit board 40 is provided with multiple control buttons 43 exposed on the lower housing 12, enabling convenient for switching on and off of the camera device and for recording functions.

Figure 16:
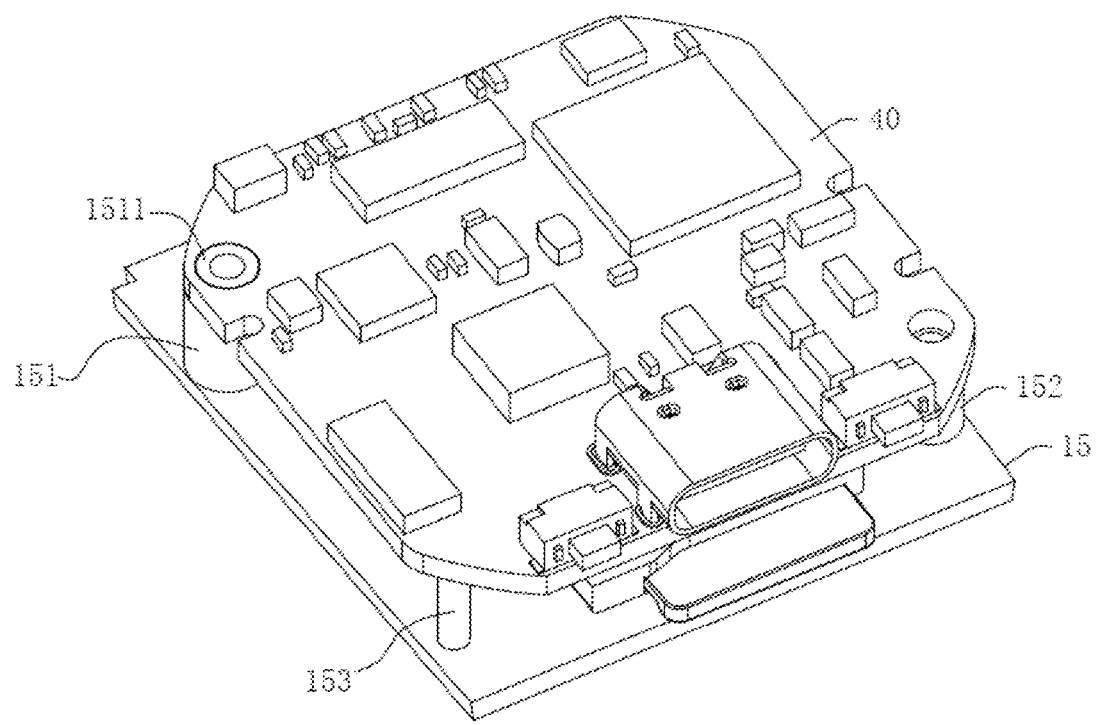
FIG. 16 is a schematic diagram showing an engagement structure between a control circuit board and a fixing plate of the present disclosure.
Figure 17:
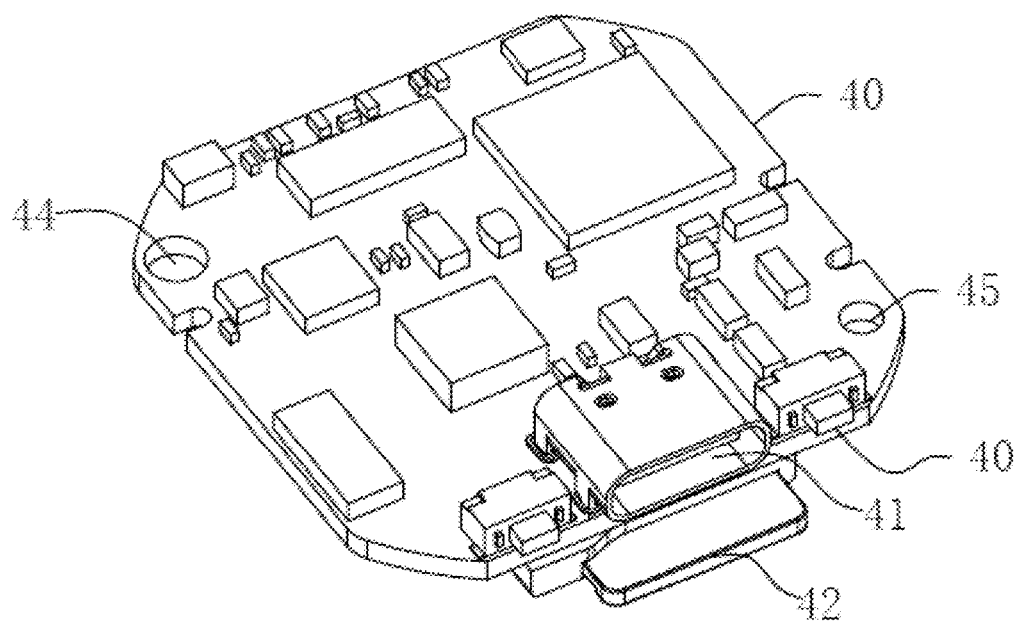
FIG. 17 is an exploded view of the engagement structure between the control circuit board and the fixing plate of the present disclosure.
Figure 17:
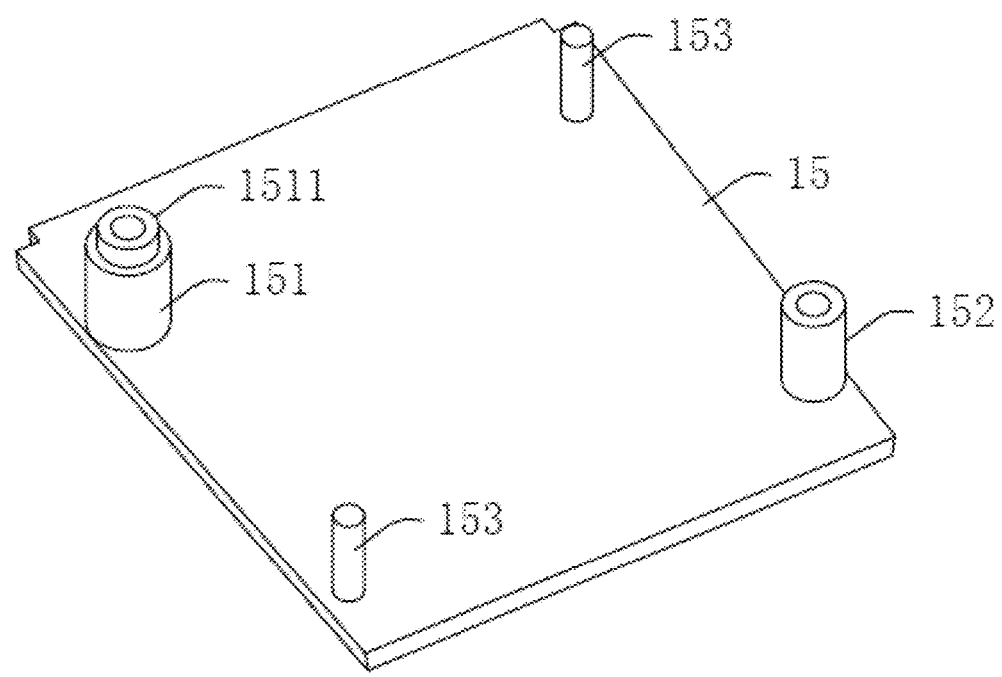

As shown in FIGS. 16-17, the lower housing 12 is internally provided with a fixing plate 15 configured to mount the control circuit board 40. The fixing plate 15 is provided with a first connection post 151 and a second connection post 152. The control circuit board 40 is secured to the first connection post 151 and the second connection post 152 via screws. The first connection post 151 includes a positioning portion 1511, and both the positioning portion 1511 and the second connection post 152 are provided with threaded holes. The control circuit board 40 is equipped with a positioning hole 44 and a connection hole 45. The positioning holes 44 are aligned with the positioning portion 1511 to allow a screw to be screwed through to connect the control circuit board 40 and the positioning portion 1511. The connection hole 45 corresponds to the threaded hole on the second connection post 152 and are fastened with screws. The fixing plate 15 also includes support posts 153 that abut against the control circuit board 40 for enhanced stability.

The fixing plate 15 extends vertically, the control circuit board 40 is mounted on one side of the fixing plate 15, and the rechargeable battery 50 is positioned on the other side of the fixing plate 15. The upper end of the control circuit board 40 is connected to the flexible circuit board 30. The charging port 41, the data port, and the control buttons 43 are located at the lower end of the control circuit board 40. The vertical arrangement of the control circuit board 40 shortens the distance between the control circuit board 40 and the camera module 21, minimizing a required length of the flexible circuit board 30.

In the embodiment, the upper end of the fixing plate 15 is fixedly connected to the guide cylinder 14, while a gap is reserved between the lower end of the fixing plate 15 and the inner wall of the lower housing 12 to allow routing of electrical wires connecting the rechargeable battery 50 and the control circuit board 40.

The technical solution partitions the lower housing 12 via the fixing plate 15, achieving a compact structure and rational layout that maximizes spatial utilization within the lower housing.

The rotating cylinder 13 is detachably connected to the upper housing 11 through a first snap-fit structure, which facilitates assembly. The first snap-fit structure includes a first snap hook 112 on the upper housing 11 and a first retaining portion on the rotating cylinder 13. The first snap hook 112 is engaged with the first retaining portion.

In the embodiment, the periphery of the rotating cylinder 13 is provided with a first mounting lug 133 with a first mounting hole 134. The first retaining portion is defined by a wall surrounding the first mounting hole 134, that is, the first snap hook 112 is engaged into the first mounting hole 134.

Similarly, the guide cylinder 14 is detachably connected to the lower housing 12 through a second snap-fit structure. The second snap-fit structure includes a second snap hook 121 on the lower housing 12 and a second retaining portion on the guide cylinder 14. The second snap hook 121 is engaged with the second retaining portion.

In the embodiment, the periphery of the guide cylinder 14 is provided with a second mounting lug 144 with a second mounting hole 145. The second retaining portion is defined by a wall surrounding the second mounting hole 145, that is, the second snap hook 121 is engaged into the second mounting hole 145.

The camera module 21 is a miniature camera module for covert recording applications.

In the camera device of the present disclosure, the camera assembly 20 can move upwards and downwards and the camera module 21 can extend outside the housing 10 for active use or retract entirely within the housing 10 for concealment. This adaptability suits diverse scenarios, particularly covert operations (e.g., placing the device in a backpack with the camera module 21 protruded through the bag opening for covert recording).

In the camera device of the present disclosure, rotation of the upper housing 11 clockwise or counterclockwise can drive the camera assembly 20 to move upwards or downwards, which is convenient for a user to operate with a single hand. It is easy and quick for operation.

The above-described embodiments merely illustrate several embodiments of the present disclosure, and the description thereof is relatively specific and detailed, but it should not be construed as limiting the scope of patent protection. It should be pointed out that, for ordinary skilled in the art, several modifications and improvements can be made without departing from the concept of the present disclosure, which all fall within the scope of protection of the present disclosure. Therefore, the protection scope of the present disclosure should be determined by appended claims.

What is claimed is:

1. A rotatable and liftable camera device, comprising
a housing, and
a camera assembly;
wherein the camera assembly is moveably mounted in the housing and is configured to move upwards or downwards between a raised position and a lowered position; and
wherein the housing comprises a lower housing and an upper housing configured to rotate relative to the lower housing along a substantially horizontal plane and the camera assembly is configured to move upwards or downwards along a substantially vertical straight line along with rotation of the upper housing relative to the lower housing.

2. The rotatable and liftable camera device according to claim 1, wherein a lifting mechanism configured to move the camera assembly upwards or downwards is arranged in the housing, and the upper housing is connected to the lifting mechanism to drive the lifting mechanism when the upper housing rotates.

3. The rotatable and liftable camera device according to claim 2 wherein
the lifting mechanism comprises a rotating cylinder and a guide cylinder;
the guide cylinder is sleeved on the camera assembly and fixedly arranged on the lower housing;
the rotating cylinder is rotatably sleeved on the guide cylinder and fixed in the upper housing; an axis of the guide cylinder coincides with a rotational axis of the rotating cylinder; and
the guide cylinder is provided with at least one rotational guide slot inclined upward from bottom to top around the rotational axis of the rotating cylinder; the rotating cylinder is provided with at least one linear guide slot extending straight along the rotational axis of the rotating cylinder; the camera assembly comprises at least one radial pin extending along a radial direction of the guide cylinder, and each radial pin is configured to extend through a corresponding one of the at least one rotational guide slot of the guide cylinder and to be inserted into a corresponding one of the at least one linear guide slot of the rotating cylinder.

4. The rotatable and liftable camera device according to claim 3, wherein
an upper end of each rotational guide slot is provided with an upper limit slot extending horizontally around the rotational axis of the rotating cylinder; a lower end of each rotational guide slot is provided with a lower limit slot extending horizontally around the rotational axis; and
the camera assembly is in a raised position when the radial pin moves into the upper limit slot, and in a lowered position when the radial pin moves into the lower limit slot.

5. The rotatable and liftable camera device according to claim 3, wherein
the number of the radial pin is two, and two radial pins are symmetrically arranged; and the number of the rotational guide slot and the number of the linear guide slot are two.

6. The rotatable and liftable camera device according to claim 3, wherein
an outer wall of the guide cylinder is provided with an annular rib, an inner wall of the rotating cylinder is provided with an annular groove, the annular rib is configured to be received in the annular groove and is rotatable relative to the annular groove.

7. The rotatable and liftable camera device according to claim 5, wherein
the camera assembly comprises a camera module; the camera module is configured to extend outside the housing when the camera assembly is in the raised position and to retract into the housing when the camera assembly is in the lowered position;
a top side of the upper housing is provided with a through hole configured to allow the camera module to protrude outside the housing; and
the camera module is configured to be exposed through the through hole when the camera assembly is in the lowered position.

8. The rotatable and liftable camera device according to claim 7, wherein
the camera assembly further comprises a bracket and a protective cover;
the radial pins are arranged on a peripheral side of the bracket;
the camera module is mounted on a top side of the bracket;
the protective cover comprises a cover portion and a connection portion arranged at a lower edge of the cover portion;
the cover portion is configured to enclose the camera module and to move along the through hold during vertical movement of the camera assembly; and
the connection portion is connected to the bracket; the connection portion abuts against an inner side of the upper housing when the camera assembly is in the raised position.

9. The rotatable and liftable camera device according to claim 8, wherein
a supporting portion is provided in the guide cylinder and configured to abut against the supporting portion when the camera assembly is in the lowered position.

10. The rotatable and liftable camera device according to claim 8, wherein
the bracket comprises a cylindrical section and a support section arranged on the cylindrical section;
the radial pins are arranged on the cylindrical section of the bracket; and
the camera module is arranged on the support section, an inner side of the cover portion of the protective cover is provided with a limiting portion, and the limiting portion abuts against the camera module to clamp camera module between the protective cover and the bracket.

11. The rotatable and liftable camera device according to claim 10, wherein
the connection portion of the protective cover is provided with insertion posts, the cylindrical section of the bracket is provided with insertion holes configured to be engaged with the insertion holes.

12. The rotatable and liftable camera device according to claim 8, further comprising a flexible circuit board, a first end of the flexible circuit board is connected to the camera assembly and is configured to move along vertical movement of the camera assembly; and a second end of the flexible circuit board is fixed relative to the lower housing.

13. The rotatable and liftable camera device according to claim 12, further comprising a control circuit board fixed inside the lower housing; wherein the bracket is in communication with the lower housing, the flexible circuit board is routed through the bracket; the first end of the flexible circuit board is connected to the camera module, and the second end of the flexible circuit board is connected to the control circuit board.

14. The rotatable and liftable camera device according to claim 13, further comprising a rechargeable battery; wherein the rechargeable battery is fixed in the lower housing and is electrically connected to the control circuit board; the control circuit board is provided with a charging port with an insertion end exposed on the lower housing.

15. The rotatable and liftable camera device according to claim 14, wherein the control circuit board is provided with a data port configured to receive a memory card, and the lower housing is provided with a slot configured to allow the memory card to be inserted through.

16. The rotatable and liftable camera device according to claim 15, wherein multiple control buttons are provided on the control circuit board and configured to be exposed on the lower housing.

17. The rotatable and liftable camera device according to claim 16, wherein
a fixing plate is provided in the lower housing, and the control circuit board is mounted on the fixing plate;
the fixing plate is provided with a first connection post and a second connection post; and the control circuit board is connected to the first connection post and the second connection post through screws;
the first connection post includes a positioning portion, both the positioning portion and the second connection post are provided with threaded holes; the control circuit board is provided with a positioning hole and a connection hole; the positioning portion is inserted into the positioning hole to allow one of the screws to be screwed through; and the threaded hole on the second connection post is aligned with the connection hole to allow another one of the screws to be screwed through.

18. The rotatable and liftable camera device according to claim 17, wherein
the fixing plate extends vertically, the control circuit board is mounted on one side of the fixing plate; the rechargeable battery is positioned on the other side of the fixing plate; and
an upper end of the control circuit board is connected to the flexible circuit board; the charging port, the data port and the control buttons are arranged at a lower end of the control circuit board.

19. The rotatable and liftable camera device according to claim 3, wherein
the rotating cylinder is detachably connected to the upper housing through a first snap-fit structure; and
the first snap-fit structure comprises a first snap hook on the upper housing and a first retaining portion on the rotating cylinder, and the first snap hook is configured to be engaged with the first retaining portion.

20. The rotatable and liftable camera device according to claim 19, wherein
the guide cylinder is detachably connected to the lower housing through a second snap-fit structure; and
the second snap-fit structure comprises a second snap hook on the lower housing and a second retaining portion on the guide cylinder, and the second snap hook is configured to be engaged with the second retaining portion.

\* \* \* \* \*